United States Patent [19]
Pitt et al.

[11] 4,339,661
[45] Jul. 13, 1982

[54] FIBRE OPTIC TRANSDUCER

[75] Inventors: Gillies D. Pitt, Walden; Roger J. Williamson, Harlow, both of England

[73] Assignee: ITT Industries, Inc., New York, N.Y.

[21] Appl. No.: 167,407

[22] Filed: Jul. 11, 1980

[30] Foreign Application Priority Data

Aug. 23, 1979 [GB] United Kingdom ............... 7929353

[51] Int. Cl.³ ........................................... G08B 13/22
[52] U.S. Cl. ................................. 250/227; 73/861.22
[58] Field of Search ..................... 250/227; 73/861.22

[56] References Cited
U.S. PATENT DOCUMENTS

4,297,684 10/1981 Butter ............................. 250/227 X

*Primary Examiner*—David C. Nelms
*Assistant Examiner*—Darwin R. Hostetter
*Attorney, Agent, or Firm*—A. Donald Stolzy

[57] ABSTRACT

An optical fibre strain gauge arrangement is employed to take advantage of a so-called speckle effect. As used in a simple strain gauge, a coherent light source, e.g. a laser, launches light via a suitable launching device into a multimode optical fibre or fibre bundle. Due to slight differences in transmission times in the fibre or fibre bundle the light as received at a detector has a speckle pattern. If the fibre or fibre bundle is subjected to strain, the various transmission times are caused to change so that the speckle pattern shifts, the amount of the shift being a measure of the strain. This principle is usable in a vortex flowmeter where the vortices produced by a bluff body influence such a fibre arrangement. Further, when used underwater, passing ships and submarines may be detected. In a building, the arrangement may be used as an intruder detection system.

1 Claim, 4 Drawing Figures

FIBRE OPTIC TRANSDUCER

This invention relates to optical transducer arrangements, and in particular to optical devices and methods for detecting and measuring movement.

SUMMARY OF THE INVENTION

In accordance with the device of the present invention, the disadvantages of the prior art may be overcome by providing means to provide an interference speckle pattern, wherein a displacement of the speckle pattern is produced.

The term 'light' as used herein is understood to include not only visible light but also radiation in the ultra-violet and inra-red regions of the electromagnetic spectrum.

BRIEF DESCRIPTION OF THE DRAWINGS

In the accompanying drawings which illustrate exemplary embodiments of the present invention.

DESCRIPTION OF THE PREFERRED EMBODIMENTS

Figure 1:
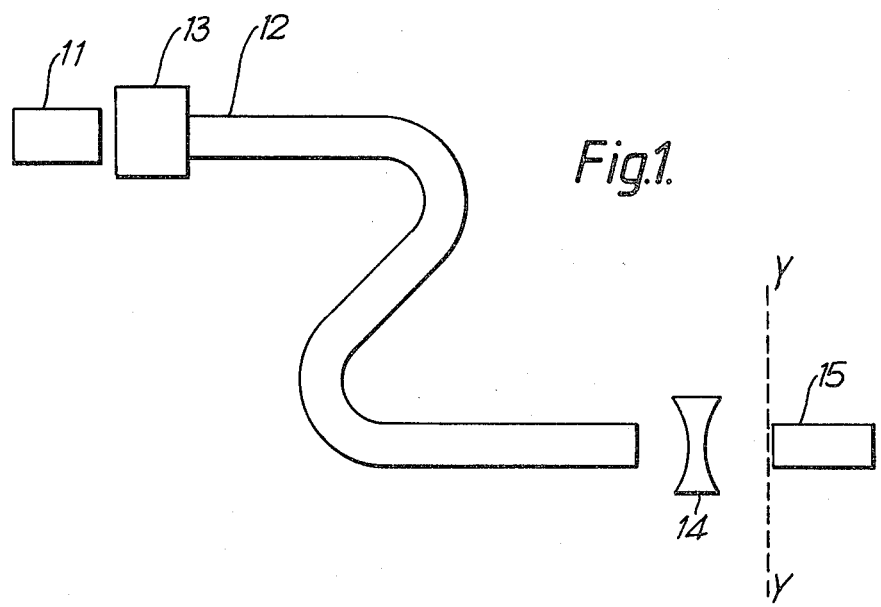
FIG. 1 is a schematic diagram of an optical transducer arrangement constructed in accordance with the present invention.

Referring to FIG. 1, coherent light, e.g. from a semiconductor laser 11, is launched into a optical fibre bundle or a multimode transmission fibre 12 via a conventional launching optic arrangement 13. Light from the output end of the fibre or fibre bundle 12, which may in some applications be fitted with a diverging lens 14, diverges into a cone, and interference pattern being produced within the cone by the phase differences introduced by the slightly different optical path lengths of the various transmission modes along the fibre or fibre bundle 12. One or more optical detectors 15, typically silicon PIN diodes, are mounted adjacent the fibre end so as to receive light transmitted via the fibre.

The interference pattern across a plane Y—Y perpendicular to the fibre axis and in which the detector 15 is mounted comprises an array of light and dark regions and is commonly known as a speckle pattern. The configuration of a speckle pattern is determined by the geometric interrelationship of the transmission modes.

Flexure of the fibre or fibre bundle 12 alters the relationship between the different transmission modes thus causing a corresponding displacement of the speckle pattern. A change of only half an optical wavelength in the difference between two path lengths causes the corresponding regions of the speckle pattern to change from light to dark and vice versa.

Figure 2:
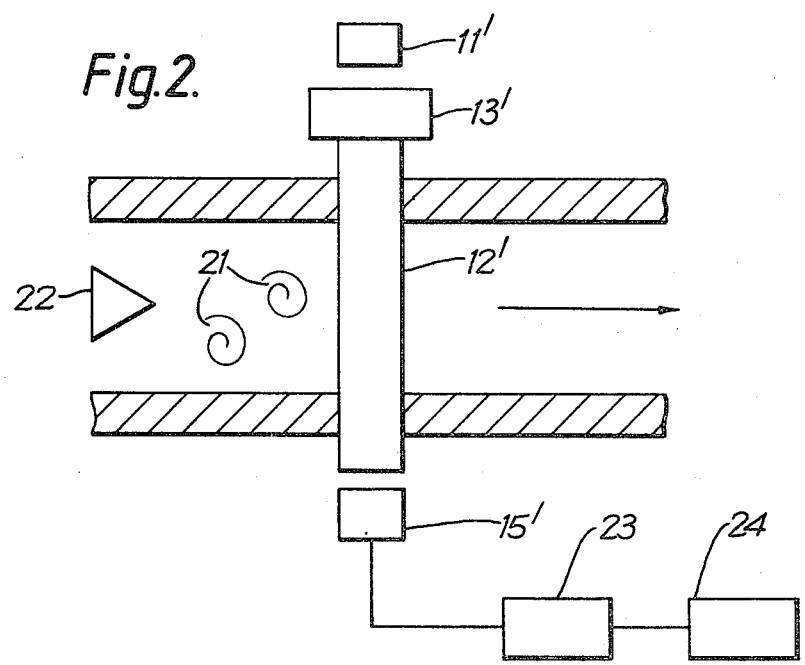
FIG. 2 is a schematic diagram of a vortex flowmeter using the transducer arrangement of FIG. 1.

FIG. 2 shows a vortex flowmeter using the speckle effect transducer arrangement of FIG. 1 as the vortex detecting element. Vortices 21 are generated by interaction of a flowing fluid of a bluff body 72, the vortices being generated at a frequency corresponding to the fluid velocity. A multimode optical fibre 12' carrying a coherent light signal is mounted across the fluid stream adjacent and downstream of the bluff body 22 and in the path of the vortices 21. Each vortex causes a slight flexure of the fibre 12' thus changing transiently the relative path lengths of the various transmission modes and producing corresponding changes in the output of a silicon PIN detector diode 15' mounted in the output interference pattern in the fibre 12'. The detector output is fed to a frequency meter 23 and a logic output circuit 24 which latter performs the calculation to derive the fluid flow velocity from the vortex frequency.

Figure 3:
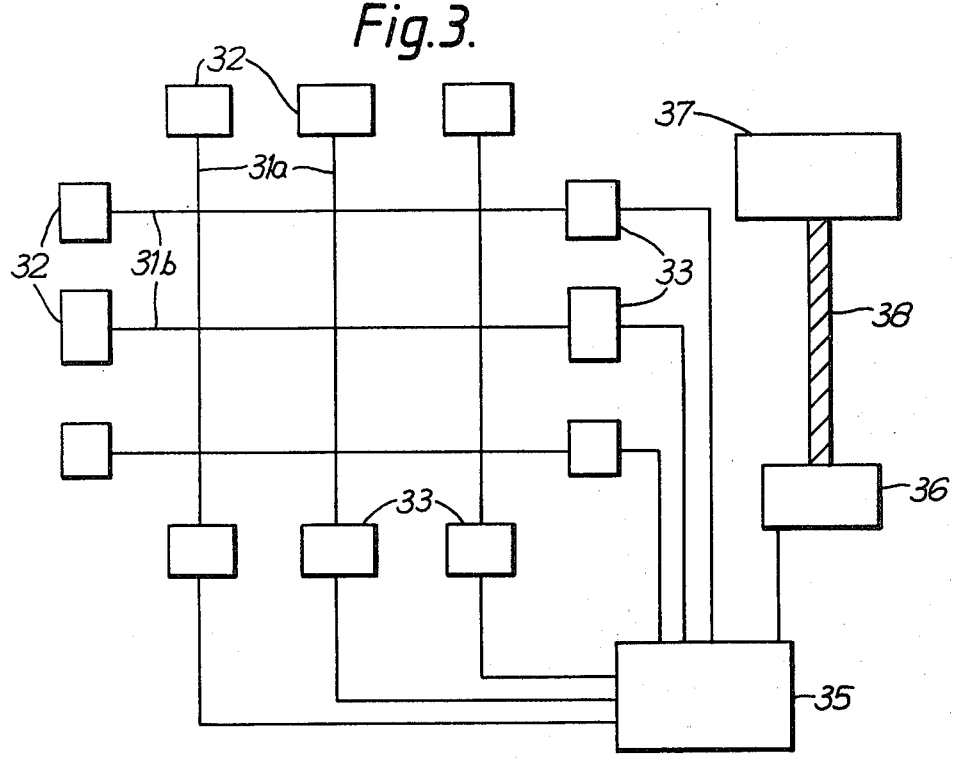
FIG. 3 is a schematic diagram of a marine vessel detector employing the transducer arrangement of FIG. 1.

FIG. 3 shows a seismometer arrangement which has particular application as an underwater detector of ships or submarines. A plurality of multimode fibres or fibre bundles 31a and 31b are laid in a rectangular grid array on the sea floor or a river bed. Each fibre is coupled to a respective laser light source 32 and to a respective detector 33, and said detector being coupled via a cable to a processor unit 35. The processor unit 35 is coupled to a transmitter 36 which latter relays signals to and from a land or ship based remote station 37 via a cable or other suitable means.

A ship or submarine crossing the array of fibres induces such transient pressure changes at the sea floor or river bed thus causing slight flexure of the corresponding fibres of the array, this flexure being sufficient to produce a measurable change in the speckle pattern received from each flexed fibre. As the vessel crosses the array the various fibres 31a and 31b of the grid array will be flexed selectively thus introducing corresponding signals from the detectors 33 coupled to the fibres. These signals are analyzed by the processor unit 35 which thereby determines the position of the vessel within the grid and, in some applications, the velocity and direction of motion of the vessel. This information is fed via the transmitter to the remote station. In a further application the processor unit 35 may also be coupled to an array of sonic transducers (not shown) disposed within the grid, which transducers transceive with corresponding vessel mounted transponders to provide identification information.

Figure 4:
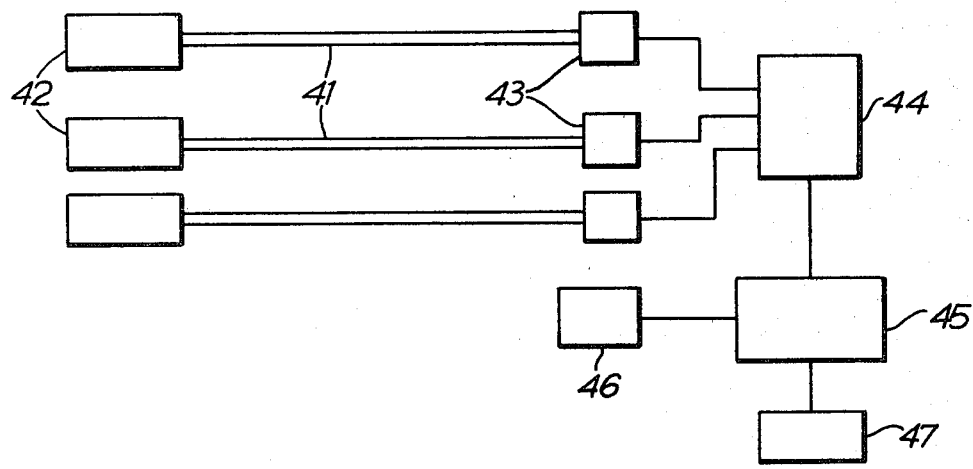
FIG. 4 is a schematic diagram of a building security system employing the transducer arrangement of FIG. 1.

FIG. 4 shows a further application of the speckle effect sensor arrangement in a building night security system. In this arrangement a plurality of multimode fibres or fibre bundles 41 are laid in the floor at various locations within the building. Each fibre 41 is provided with a corresponding laser light source 42 and speckle pattern detector diode 43, the outputs of the detector diodes 43 being coupled, e.g. via a multiplexing arrangement 44, to a central control station 45. Any slight flexure of the building floor, cause, e.g., by an intruder, introduces changes in the phase differences between the various fibre optic transmission modes thus producing changes in the speckle pattern of the flexed fibre. This change is detected by the corresponding detector diode 43 the output of which is monitored by the control station 45. In response to the detector output the control 45 activates an alarm 46 and a display 47 providing a visual indication of the location of the intruder.

An application of a device such as that of FIG. 1 is as a fuse in a mine, either a sea mine or a land mine. This would include an assembly such as that of FIG. 1 as a capsule fitted in the mine: vibrations due to a passing ship (or tank for instance in the case of a land mine) would set the device off.

A similar arrangement may be employed to indicate opening and closing of a strong room door, e.g., the door of a bank vault. A multimode fibre burial in the structure behind the door joint responds to the different stresses applied to the joint as the door swings open or shut.

What is claimed is:

1. In a transducer arrangement, the combination comprising: a pipeline; a coherent light source; optical detection means having an output; a flexible optical transmission line mounted to span the interior of said pipeline and coupled between said light source and said detection means; and a bluff body mounted in said pipeline upstream of said flexible optical transmission line, said flexible optical transmission line providing a plurality of light paths between said light source and said detection means, said flexible optical transmission line generating an interference speckle pattern in an area including said detection means, a predetermined flexure of said flexible transmission line changing the relative lengths of a plurality of light paths therethrough, said change of paths causing a displacement of said speckle pattern, said displacement producing a corresponding change in the output of said detection means, said flexible optical transmission line including a multimode optical fiber of a flexibility such that vortices, when produced by and when emanating from said bluff body, pass in proximity to said transmission line and produce a plurality of said predetermined flexures.

* * * * *